3,176,052
BLENDS OF POLYETHYLENE AND ETHYLENE COPOLYMERS
Warner Leland Peticolas, San Jose, Calif., assignor to E. I. du Pont de Nemours and Company, Wilmington, Del., a corporation of Delaware
No Drawing. Filed Aug. 8, 1960, Ser. No. 47,896
8 Claims. (Cl. 260—897)

The present invention relates to novel polyolefins, and, more particularly, to polyolefin resins obtained by blending.

In accordance with the present invention, it was discovered that blends of copolymers of ethylene and α-olefins, generally obtained by polymerization with coordination catalysts, and polyethylene, obtained by free radical initiated polymerization, have improved physical properties, particularly when fabricated into film. The physical properties of the blend are superior to those of either the copolymer or the polyethylene alone with respect to ease of fabricability and optical properties of a melt extruded film. The improvement in properties is obtained when the concentration of the copolymer is maintained at 25 to 95% by weight of the blend.

The copolymers employed in the formation of the blend are copolymers of ethylene and α-olefins wherein the α-olefin has from 3 to 15 carbon atoms. Suitable examples of the α-olefin are propylene, butene-1, pentene-1, hexene-1, vinyl cyclohexane, styrene, octene-1, decene-1, dodecene-1, etc. More than one α-olefin may be employed in the formation of the copolymer. Thus, terpolymers of ethylene, propylene and decene-1 or ethylene and styrene are suitable components for the blend. The term "copolymer of ethylene and α-olefin" is, therefore, meant to include copolymers of ethylene and more than one α-olefin. Similarly, more than one copolymer may be employed to form the copolymer blend component. Thus, a copolymer of ethylene and propylene and a copolymer of ethylene and decene may be blended to form the copolymer component. The concentration of the olefin in the copolymer may vary, but is generally less than 20% by weight of the copolymer. Preferably, the concentration of the α-olefin comonomer is from 1 to 10%. The optimum concentration may very somewhat with the individual α-olefin employed. However, in general, the concentration of the α-olefin should be such that the annealed density of the resin is above 0.92 g./cc. These copolymers are prepared by coordination catalysis or by the use of supported metal oxide catalysts, both of which have been described extensively in the art. In general, coordination catalysts involve a reduced transition metal obtained by reaction of a transition metal halide with a metallic reducing agent, such as metal alkyl. Similarly, the copolymerization of ethylene and α-olefins has been extensively described in the literature, so that no further description of the preparation of the copolymers employed in the present invention is believed to be necessary. The copolymers employed in the formation of the blend are preferably selected from copolymers having a relatively low melt index and, therefore, a high molecular weight. Thus, a suitable melt index range for the copolymer is from 0.01 to 10 g./10 min.

The polyethylene obtained by free radical initiated polymerization, commonly known as "branched" or "low density" polyethylene is commercially available and well-defined in the literature. In general, the polyethylene employed in the present invention has an annealed density of 0.910 to 0.940 g./cc. In the blend of the present invention, it is preferred to employ a polyethylene of high melt index for optimum results. A particularly suitable range of polyethylenes are those having melt indices from 0.1 to 20 g./10 min.

The greatest improvement in optical properties is obtained when the melt indices of the copolymer and the polyethylene are selected in a manner such that the melt index of the copolymer is lower than that of the polyethylene.

The blending of the two polymers may be accomplished in many ways known to those skilled in the art. Thus, a physical mixture of the two polymers in powder or in pellet form can be blended into a uniform composition by Banburying or by milling the composition on calender rolls using temperatures above the melting point of the higher melting component. In a preferred embodiment, a rough mixture of the two polymers is put through a melt extruder containing a mixing extrusion screw or a mixing section on the extrusion screw. Other means of obtaining a homogenous blend will be apparent to those skilled in the art.

The surprising improvement in physical properties discovered to be possessed by the blend is shown by the attached table wherein the optical properties of a blown film, as characterized by gloss of the film, made from the low density polyethylene, the copolymer and the blend are compared. The gloss was measured on the Gardener Gloss Meter and represents the 20° gloss. The comparative gloss measurements on the low density polyethylene film and the copolymer film were made on films of these resins in which the resins had substantially the same melt index and density as the blend, and which resins, furthermore, had been worked and extruded under identical conditions. The method employed to extrude the blown film is described in U.S. Patent 2,461,975, issued to E. D. Fuller on February 15, 1949. The following conditions were employed.

Extruder type _____ 1½" modern plastic.
Screw _____ Constant pitch, constant depth.
Screw speed _____ 80 r.p.m.
Barrel temperature:
    Back _____ 115° C.
    Front _____ 150° C.
Temperature of polymer
    melt _____ 160° C. (at the die).
Die:
    Opening _____ 0.020".
    Diameter _____ 4".
    Temperature ____ 160–164° C.
Film thickness _____ 1.25 mils.
Air pressure:
    Within tube _____ 0.08" of water.
    Cooling ring ____ 4" of water.
Air temperature _____ 31° C.
Take-up speed _____ 23 ft./min.

Table

| Comonomer | | Copolymer | | | Polyethylene | | | Blend | | Gloss | | |
|---|---|---|---|---|---|---|---|---|---|---|---|---|
| Type | Conc., Percent | Melt Index[1], g./10 min. | Density[2], g./cc. | Content in Blend, Percent | Melt Index[1], g./10 min. | Density[2], g./cc. | Content in Blend, Percent | Melt Index[1], g./10 min. | Density[2], g./cc. | Copolymer | Polyethylene | Blend |
| Butene-1 | 6 | 0.5 | 0.928 | 40 | 8.5 | 0.922 | 60 | 1.32 | 0.924 | 30 | 20 | 75 |
| Do | 3 | 1.2 | 0.938 | 40 | 8.5 | 0.922 | 60 | 2.5 | 0.928 | 25 | 40 | 67 |
| Do | 2 | 1.0 | 0.943 | 40 | 8.5 | 0.922 | 60 | 1.9 | 0.930 | 6 | 40 | 56 |
| Do | 3.5 | 1.4 | 0.936 | 90 | 3.2 | 0.921 | 10 | 1.9 | 0.934 | 25 | 35 | 70 |
| Octene-1 | 3.2 | 0.5 | 0.937 | 40 | 10 | 0.920 | 60 | 2.2 | 0.927 | 18 | 40 | 69 |
| Decene-1 | 4.0 | 1.4 | 0.935 | 40 | 9 | 0.921 | 60 | 3.5 | 0.926 | 25 | 50 | 74 |

[1] Measured by ASTM D-1238-57-T.
[2] Annealed density measured by ASTM D-792-50.

The foregoing table demonstrates the nature of the unusual improvement in optical properties obtained with film made with the blends of the present invention. It will be understood that the improved compositions of the present invention are not limited to the specific compositions set forth, but are obtained with all of the blends that can be prepared within the limits stated hereinabove. The improved properties of the blend are believed to result from the crystallization behavior of the blend, differing from that of either of the components of the blend. Thus, the crystallization rate of the copolymer is high due to its more regular structure and the absence of long chain branching. The low density polyethylene crystallizes more slowly. A blend of the two gives intermediate rates of crystallization which in turn result in superior optical properties. Since the various comonomers and various concentrations of the comonomer have only a minor effect on the overall rate of crystallization when compared to the rate of crystallization of low density polyethylene, it will be apparent that the improvement in optical properties will be obtained with all blends within the limitation described.

In addition to the improvement in optical properties of the blend, there is also obtained an improvement in the fabricability as compared to that of the components of the blend. This again is explained by the rates of crystallization allowing more rapid solidification and greater strength of the extrudate than that of polyethylene.

As in other polyolefin compositions, stabilizers, antioxidants, plasticizers, pigments, fillers and similar additives can be incorporated into the blends of the present invention. The compositions of the present invention can be fabricated into film, fiber, sheeting, rod, tubing, pipe and a variety of molded objects, using methods generally employed in the fabrication of polyolefins. In particular, the compositions of the present invention are outstanding as film resins.

I claim:
1. A homogeneous polyolefin blend comprising 5 to 75 weight percent of polyethylene, prepared by free radical initiated polymerization, having an annealed density of 0.910 to 0.940 g./cc. and complementally therewith 25 to 95 weight percent of a compolymer of ethylene and α-olefin having an annealed density of above 0.92 g./cc. and a melt index of 0.1 to 10 g./10 min., said olefin having from 3 to 15 carbon atoms and being present in the copolymer in a concentration of up to 20 weight percent.

2. A homogeneous polyolefin blend comprising from 10 to 60 weight percent of polyethylene, prepared by free radical initiated polymerization, having an annealed density of 0.910 g./cc. to 0.940 g./cc. and 90 to 40 weight percent of a copolymer of ethylene and an α-olefin, said α-olefin being a member selected from the group consisting of butene-1, octene-1 and decene-1 and being present in said copolymer in a concentration of 1 to 10 weight percent, said polyethylene having a melt index of 0.1 to 20 g./10 min. and said copolymer having a melt index of 0.01 to 10 g./10 min., the melt index of the copolymer being lower than the melt index of the polyethylene.

3. The composition of claim 1 wherein the concentration of the α-olefin in the copolymer is from 1 to 10 weight percent.

4. The composition of claim 1 wherein the polyethylene has a melt index of 0.1 to 20 g./10 min. and the copolymer, a melt index of 0.01 to 10 g./10 min., the melt index of the copolymer being lower than the melt index of the polyethylene.

5. The composition of claim 4 wherein the copolymer is a copolymer of ethylene and butene.

6. The composition of claim 4 wherein the copolymer is a copolymer of ethylene and decene.

7. The composition of claim 1 in the from of a molded article.

8. The combination of claim 1 in the form of a film.

References Cited by the Examiner

UNITED STATES PATENTS

| 2,563,631 | 8/51 | Young et al. | 260—897 |
| 2,791,576 | 5/57 | Field et al. | 260—897 |
| 2,928,756 | 3/60 | Campbell | 260—897 |
| 2,983,704 | 5/61 | Roedel | 260—897 |

FOREIGN PATENTS

| 602,151 | 7/60 | Canada. |
| 1,240,852 | 8/60 | France. |

LEON J. BERCOVITZ, *Primary Examiner.*

D. ARNOLD, WILLIAM H. SHORT, *Examiners.*

UNITED STATES PATENT OFFICE
CERTIFICATE OF CORRECTION

Patent No. 3,176,052                  March 30, 1965

Warner Leland Peticolas

It is hereby certified that error appears in the above numbered patent requiring correction and that the said Letters Patent should read as corrected below.

Column 1, line 32, after "ethylene", second occurrence, insert -- , propylene --; line 44, for "very" read -- vary --; same column 1, line 53, after "as" insert -- a --; column 2, line 50, for "150° C." read -- 153° C. --; column 3, line 59, for "compolymer" read -- copolymer --; column 4, line 44, for "from" read -- form --; line 46, for "combination" read -- composition --.

Signed and sealed this 24th day of August 1965.

(SEAL)
Attest:

ERNEST W. SWIDER                          EDWARD J. BRENNER
Attesting Officer                            Commissioner of Patents